US012796618B2

(12) United States Patent
Solimar Walter

(10) Patent No.: US 12,796,618 B2
(45) Date of Patent: Nov. 17, 2026

(54) FEEDERHOUSE FOR A COMBINE HARVESTER

(71) Applicant: AGCO do Brasil Soluções Agrícolas Ltda., Ribeirao Preto (BR)

(72) Inventor: Airton Solimar Walter, Canoas (BR)

(73) Assignee: AGCO do Brasil Soluções Agrícolas Ltda., Ribeirao Preto (BR)

(*) Notice: Subject to any disclaimer, the term of this patent is extended or adjusted under 35 U.S.C. 154(b) by 190 days.

(21) Appl. No.: 18/937,242

(22) Filed: Nov. 5, 2024

(65) Prior Publication Data

US 2025/0143220 A1 May 8, 2025

(30) Foreign Application Priority Data

Nov. 6, 2023 (GB) ..................................... 2317040

(51) Int. Cl.

| | |
|---|---|
| ***A01F 12/10*** | (2006.01) |
| ***A01D 41/16*** | (2006.01) |
| ***A01D 61/00*** | (2006.01) |
| ***A01D 75/18*** | (2006.01) |

(52) U.S. Cl.

CPC .............. *A01F 12/10* (2013.01); *A01D 41/16* (2013.01); *A01D 61/008* (2013.01); *A01D 75/182* (2013.01)

(58) Field of Classification Search

CPC ....... A01F 12/10; A01D 41/16; A01D 61/008; A01D 75/182

See application file for complete search history.

(56) References Cited

U.S. PATENT DOCUMENTS

| | | | | |
|---|---|---|---|---|
| 1,913,172 A | | 6/1933 | Schlayer | |
| 4,776,153 A | * | 10/1988 | DePauw | A01D 75/287 56/DIG. 15 |
| 5,203,738 A | * | 4/1993 | Busse | A01D 41/16 460/21 |
| 9,867,324 B2 | * | 1/2018 | De Coninck | A01B 63/004 |
| 10,681,866 B2 | * | 6/2020 | Solimar Walter | E02F 3/3636 |
| 11,109,533 B2 | * | 9/2021 | Zhao | A01F 12/16 |
| 2002/0005033 A1 | * | 1/2002 | Uhlending | A01D 75/287 56/15.8 |
| 2004/0045877 A1 | | 3/2004 | Rubie et al. | |
| 2013/0219846 A1 | * | 8/2013 | Verhaeghe | A01D 41/145 29/891 |
| 2022/0256769 A1 | * | 8/2022 | Solimar Walter | A01D 41/145 |
| 2022/0304229 A1 | * | 9/2022 | Racchella | A01D 41/16 |

FOREIGN PATENT DOCUMENTS

| | | |
|---|---|---|
| GB | 2171881 B | 9/1988 |

OTHER PUBLICATIONS

UK Intellectual Property Office, Search Report for related UK Application No. GB2317040.0, dated May 2, 2024, 3 pages.

* cited by examiner

*Primary Examiner* — Nicole Coy

(57) ABSTRACT

A feederhouse is provided for delivering crop material to the threshing system of a combine harvester. The feederhouse has a frame structure with a tilt frame, pitch frame, and front and rear housing sections. First and second lift actuators and lift actuator pins and first and second pitch actuators and pitch actuator pins are provided. First and second reinforcement bars are provided at opposite lateral sides, wherein each reinforcement bar connects to the lift actuator pin and pitch actuator pin at a first end and to the rear housing section at the opposite second end.

8 Claims, 9 Drawing Sheets

FEEDERHOUSE FOR A COMBINE HARVESTER

CROSS-REFERENCE TO RELATED APPLICATIONS

This application claims the benefit of the filing date of U. K. Provisional Patent Application 2317040.0, “Feederhouse for a Combine Harvester,” filed Nov. 6, 2023, the entire disclosure of which is incorporated herein by reference.

FIELD

Embodiments of the present disclosure relate generally to combine harvesters, and in particular to the feederhouse used to deliver crop material to the threshing system of the combine harvester.

BACKGROUND

A combine harvester typically includes a crop cutting head (header) and a threshing system for detaching grains of cereal from the ears of cereal. A delivery system delivers the cut crop to the threshing system, known as the feederhouse. A separating apparatus is downstream of the threshing system, and a grain cleaning apparatus receives grain from the separating apparatus. A stratification pan aims to stratify the material into a layered structure of grain at the bottom and light chaff and other material other than grain (MOG) at the top.

The header is typically in the form of a wide array of cutters and a delivery auger (or belt) to feed the cut material to the central feederhouse. The feederhouse is typically in the form of a conveyor chain with cross bars that transport the crop material. The feederhouse supports the header, and typically also includes a control system for controlling a height, pitch and tilt of the header. A hydraulic drive is typically used to raise and lower the header, using hydraulic cylinders coupled between the chassis of the combine harvester and the feederhouse, and hydraulic actuators are used to control the pitch and tilt of the header relative to the main body of the feederhouse.

There are various designs for the threshing system and for the separating apparatus (e.g. axial or transverse) as well as for the grain cleaning apparatus. However, in all designs, there is a flow of material from the threshing system to the separating apparatus, and between the separating apparatus and the grain cleaning unit, in particular from the stratification pan to the grain cleaning unit. The threshing system typically comprises threshing rotors that rotate with respect to concave gratings (known simply as “concaves”). The threshing rotors may be arranged transversally or longitudinally with respect to the direction of travel of the combine harvester.

The header and feederhouse are some of the limiting performance factors of modern large combines. There is a trend to increase the size and weight of the header, and the maximum throughput of combines is also increasing. Machines with more capacity to process more material can be run faster, but this means the header height control system (called the Auto Header Height Control; AHHC) needs to react faster and hence it is also operated more frequently. The cycles of height control of the header generate several load cycles at the feederhouse structure.

One of the cycles that generates damage to the feederhouse structure is the vertical torsion load. This results, in particular, when the feederhouse is controlled to tilt the header. By way of example, in some cases there is a need for the feederhouse to tolerate a 50 kN load at 1.5 m distance from the center. An increasing header weight also contributes a greater vertical load.

These increasing loads can result in failure of the feederhouse structure. It is however difficult simply to increase the strength of the feederhouse because access is needed to the internal mechanism, so that the frame structure of the feederhouse needs removable panels. This complicates the aim of providing increased torsional and vertical load tolerance.

There is therefore a need for an improved feederhouse design.

BRIEF SUMMARY

The invention is defined by the claims. According to examples in accordance the invention, there is provided a feederhouse for a combine harvester, comprising:

- a drive belt;
- a frame structure which encloses the drive belt, wherein the frame structure comprises:
  - a tilt frame for connection to a header, wherein the tilt frame is rotatably adjustable about a longitudinal axis;
  - a pitch frame connected to the tilt frame, wherein the pitch frame is rotatably adjustable about a lateral axis;
  - a front housing section which connects to the pitch frame; and
  - a rear housing section which has a pivotable connection for connection to a chassis of the combine harvester,
- first and second lift actuators and first and second lift actuator pins, wherein the lift actuator pins each connect to the front housing section at opposite lateral sides and the lift actuators each connect to a lift actuator pin at one end and are for connection to the combine harvester chassis at the other end;
- first and second pitch actuators and first and second pitch actuator pins, wherein the pitch actuator pins each connect to the front housing section at opposite lateral sides and the pitch actuators each connect to a pitch actuator pin at one end and connect to the pitch frame at the other end; and
- first and second tilt actuators each connected between the tilt frame and the pitch frame, at opposite lateral sides,
- wherein the feederhouse further comprises first and second reinforcement bars at opposite lateral sides, wherein each reinforcement bar connects to the lift actuator pin and pitch actuator pin at a first end and to the rear housing section at the opposite second end.

This feederhouse structure is able to tolerate increased vertical torsion load resulting from tilting actuation of the feederhouse and also increased vertical load resulting from an increase in header weight.

The feederhouse has a pair of links between (i) the actuator pins (i.e., the inner bushings) of the lift actuators (lift cylinders) and the actuator pins, i.e., inner bushings, of the pitch actuators (pitch cylinders)) and (ii) the rear housing where the main pivotal connection is made between the feederhouse and the combine harvester chassis. The reinforcement bars work either in traction or in compression depending on which way the header is tilting.

This structure gives an improved distribution of internal stresses and strains and thus enables increased torsional as well as vertical load to be tolerated by the feederhouse structure. The design depends more on the component designs and less on the manufacturing process especially welds which usually are the weak points for fatigue.

The feederhouse for example further comprises a first cross brace connected between the first end of the first reinforcement bar and the second end of the second reinforcement bar and a second cross brace connected between the second end of the first reinforcement bar and the first end of the second reinforcement bar.

These two cross braces together from an X brace to stabilize the two lateral sides.

The lift actuators, pitch actuators and tilt actuators preferably each comprise a hydraulic cylinder. They each have a bush at each end which connects around a respective pin, and the actuation sets the distance between the pins at each end.

The first and second reinforcement bars for example are at an underside of the feederhouse.

The front housing section and rear housing section for example comprise lateral metal casts and one or more cross bars connecting the lateral metal casts. The metals casts, cross bars, and the reinforcement bars between them provide the main structural integrity of the frame.

The feederhouse preferably further comprises paneling between the front and rear housing sections. However, since this paneling is no longer a main structural feature, the load bearing capacity is no longer dependent on the way the panels are connected, for example welds or bolts.

One or more panels are for example removable from the underside of the feederhouse. This gives access to the belt and other internal components of the feederhouse.

The invention also provides a combine harvester comprising:

a crop cutting head;

the feederhouse defined above;

a threshing system;

a separating system; and a grain cleaning system for receiving the cut and threshed crop material.

BRIEF DESCRIPTION OF THE DRAWINGS

One or more embodiments of the invention/disclosure will now be described, by way of example only, with reference to the accompanying drawings, in which.

DETAILED DESCRIPTION

Figure 1:
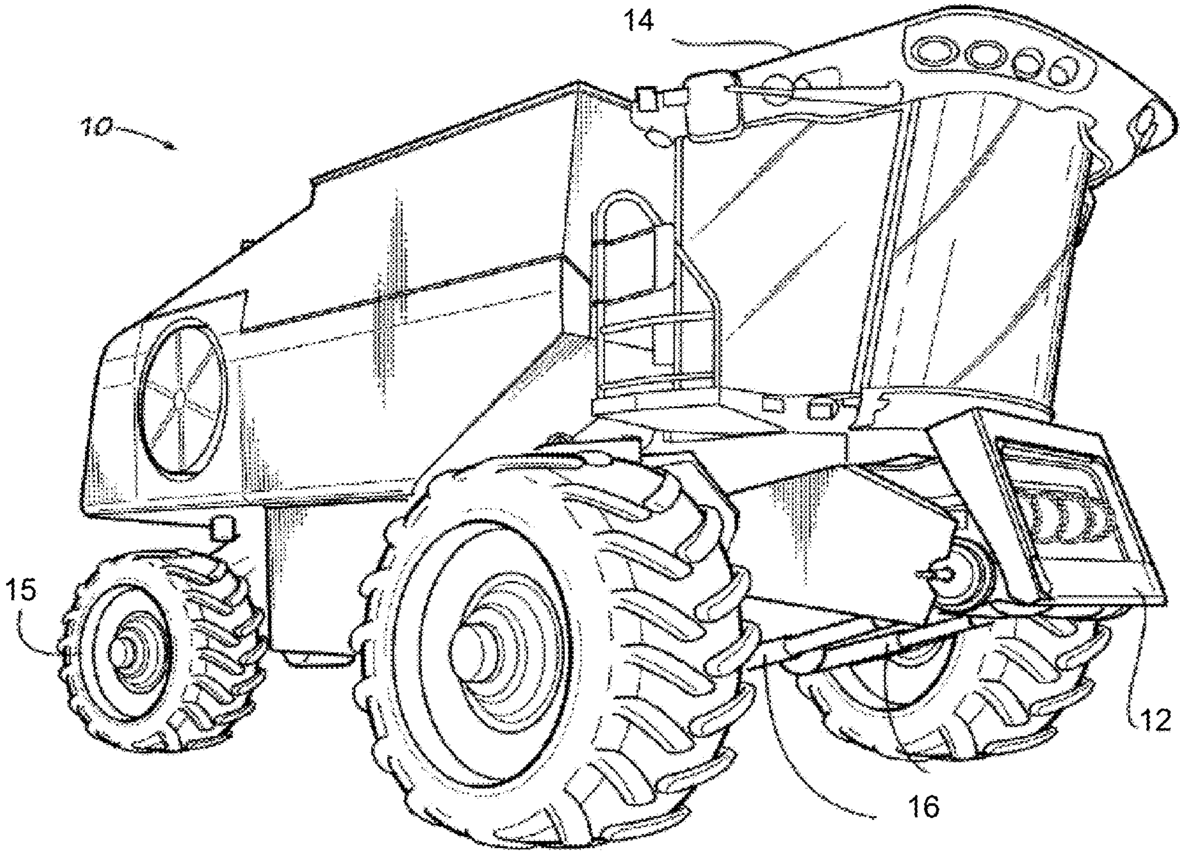
FIG. 1 shows a combine harvester (without a header)

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

This disclosure relates to the design of the feederhouse used to deliver cut crop material to the processing system of a combine harvester.

FIG. 1 shows a combine harvester 10 without a header, and from front to back, comprises a feederhouse 12 and an operator cab 14 that is mounted to a chassis supported by wheels 15. In some embodiments, other or additional forms of travel may be used, such as tracks. Also shown are plural hydraulic cylinders 16 that are affixed in this example to the underside of the feederhouse 12 on one end and to the chassis on the other end in known manner. As is known, the feeder house 12 moves (e.g., up and down, tilt, etc.) based on actuation of the hydraulic cylinders 16, which causes a detachably coupled header to also be raised, lowered, and/or tilted.

Figure 2:
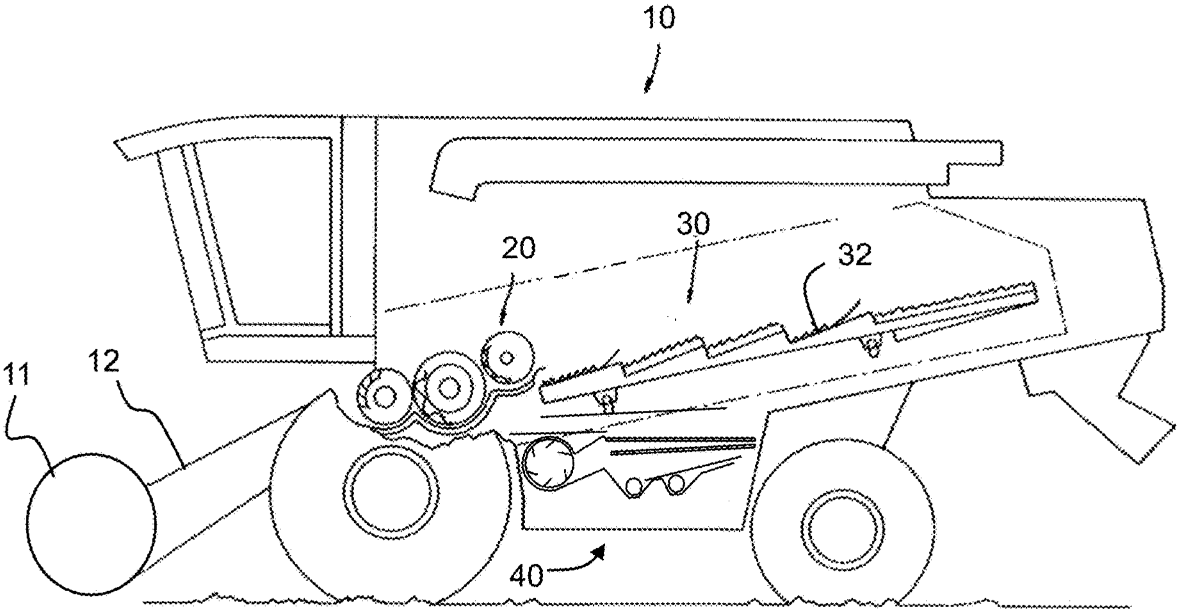
FIG. 2 shows the known combine harvester with one example of the internal mechanism shown.

FIG. 2 shows the known combine harvester 10 with one example of the internal mechanism shown. A header 11 functions as a crop cutting head and comprises a wide laterally extending transverse auger or belt, which cuts the crop material and drives it inwardly towards a central area. A front elevator housing receives the cut crop material and includes the feederhouse 12 for transporting the crop material.

The feederhouse delivers the crop material to a threshing system 20 for detaching grains of cereal from the ears of cereal, and a separating apparatus 30 which is connected downstream of the threshing system 20. The threshing system comprises one or more threshing units, in particular rotors, and associated concaves.

In the example shown, the separating apparatus 30 includes a plurality of parallel, longitudinally-aligned, straw walkers 32, and this is suitable for the case of a so-called straw-walker combine. The grains after separation by the separating device 30 pass to a grain cleaning apparatus 40.

In the example shown, the threshing system 20 is a tangential-flow 'conventional' threshing system, i.e., formed by rotating elements with an axis of rotation in the side-to-side direction of the combine harvester and for generating a tangential flow. For example, the 'conventional' threshing system includes a rotating, tangential-flow, threshing cylinder and a concave-shaped grate. The threshing cylinder includes rasp bars (not shown) which act upon the crop stream to thresh the grain or seeds from the remaining material, the majority of the threshed grain passing through the underlying grate and onto a stratification pan (also sometimes known as the grain pan).

There are also axial threshing systems, i.e., formed by rotating elements with an axis of rotation in the longitudinal direction (direction of travel). For example, the threshing section may have axially-aligned rasp bars spaced around the front section whilst the separating section has separating elements or fingers arranged in a pattern, e.g., a spiral pattern, extending from the rasp bars to the rear of the rotor.

This disclosure relates to the design of the feederhouse and header, and in particular relates to the design of the feederhouse to enable the structure to tolerate increased loads to enable a larger header and/or increased operating speeds to be tolerated.

Figure 3:
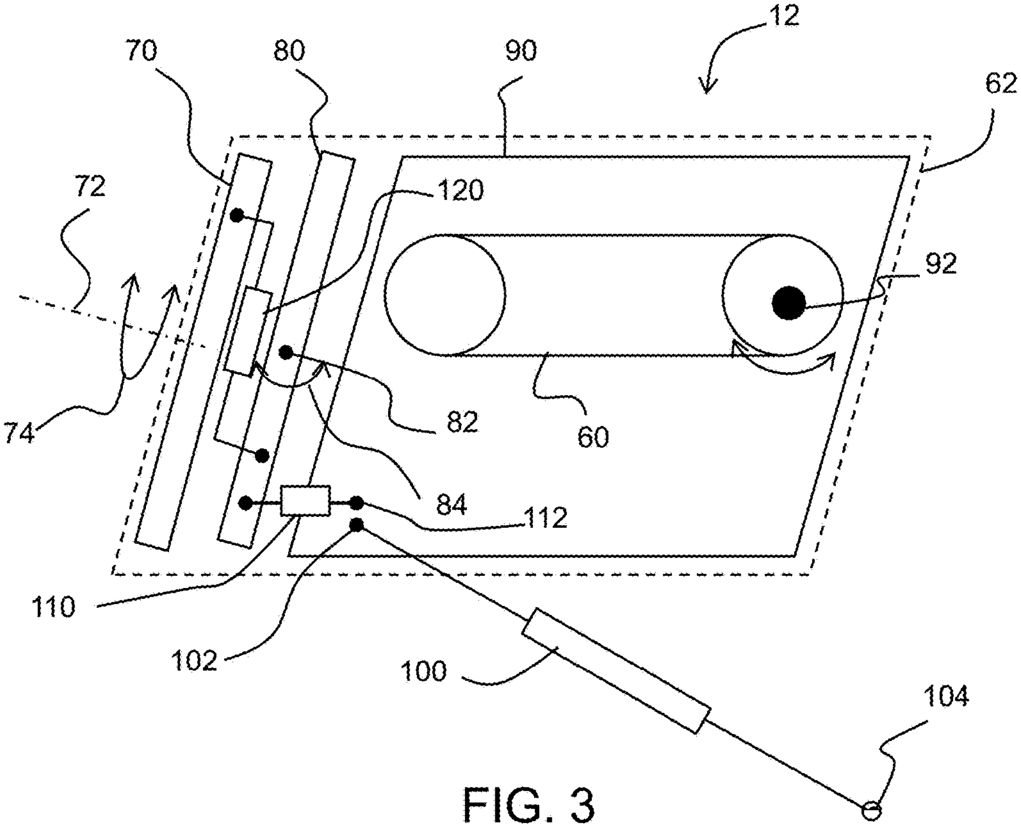
FIG. 3 shows in schematic from the basic elements of a known feederhouse 12.

FIG. 3 shows in schematic from the basic elements of a known feederhouse 12.

The feederhouse 12 comprises a drive belt 60 mounted within a frame structure 62. The frame structure 62 comprises a tilt frame 70 for connection to the header. The tilt frame is rotatably adjustable about a longitudinal axis 72 as shown by arrow 74. The longitudinal axis extends in the for-aft direction of the combine. For a horizontal longitudinal axis, the rotation would be in a vertical plane, but the tilt frame may in fact have a backward tilt so that the rotation is in a backward tilted plane. Tilting the tilt frame raises one side of the cutting head and lowers the other side so that the cutting head remains at a constant distance to the ground when there is a lateral ground slope.

A pitch frame 80 is mounted behind the tilt frame. The pitch frame is rotatably adjustable about a lateral axis 82, namely an axis extending horizontally across the lateral width direction of the combine, as shown by arrow 84. Adjusting the pitch frame tips the top of the cutting head forward or backward.

The pitch frame connects to the front of an enclosed framework 90, and the rear of the framework 90 has a pivotable connection 92 to a chassis of the combine harvester. This is the same rotation axis as the rotation axis of a rear roller of the belt 60.

There are actuators for controlling the various parts of the feederhouse. FIG. 3 is a side view, and the actuators shown are all at one side of the feederhouse, but there are pairs of each type of actuator, with one of each pair at each side of the feederhouse.

Lift actuators 100 connect to the front of the framework. They extend between a lift actuator bush, around a lift actuator pin 102 at one end, and they connect to the combine harvester chassis at the other end, at bush 104.

Pitch actuators 110 connect to the front of the framework. They extend between a pitch actuator bush, around a pitch actuator pin 112 at one end and connect to the pitch frame at the other end (again using a pin and bush arrangement).

Tilt actuators 120 connect between the tilt frame and the pitch frame (again with a pin and bush arrangement at each end). The tilt actuators on opposite sides work in opposite directions to rotate the tilt frame 70.

A problem with this design is that the vertical load and vertical torsion can result in component fatigue, in particular the framework part.

Figure 4:
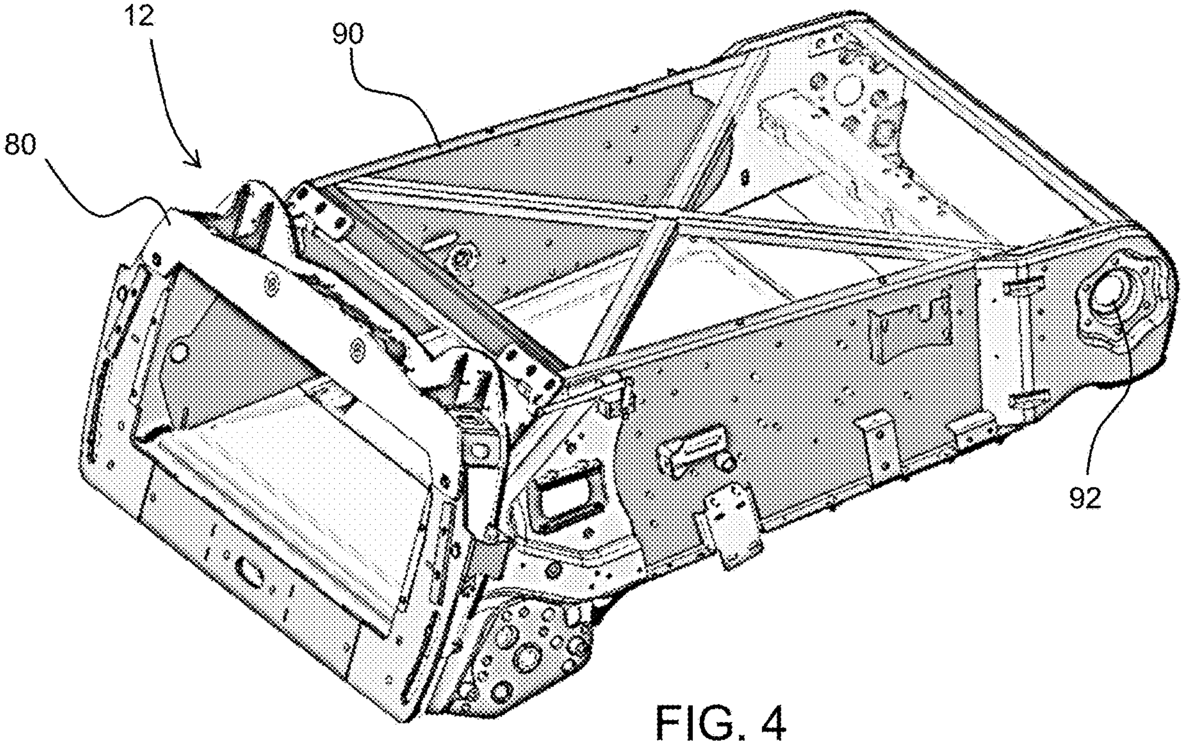
FIG. 4 shows an example of the framework and attached pitch frame of a known feederhouse.

FIG. 4 shows an example of the framework 90 and attached pitch frame 80 of a known feederhouse (without showing the tilt frame).

Figure 5:
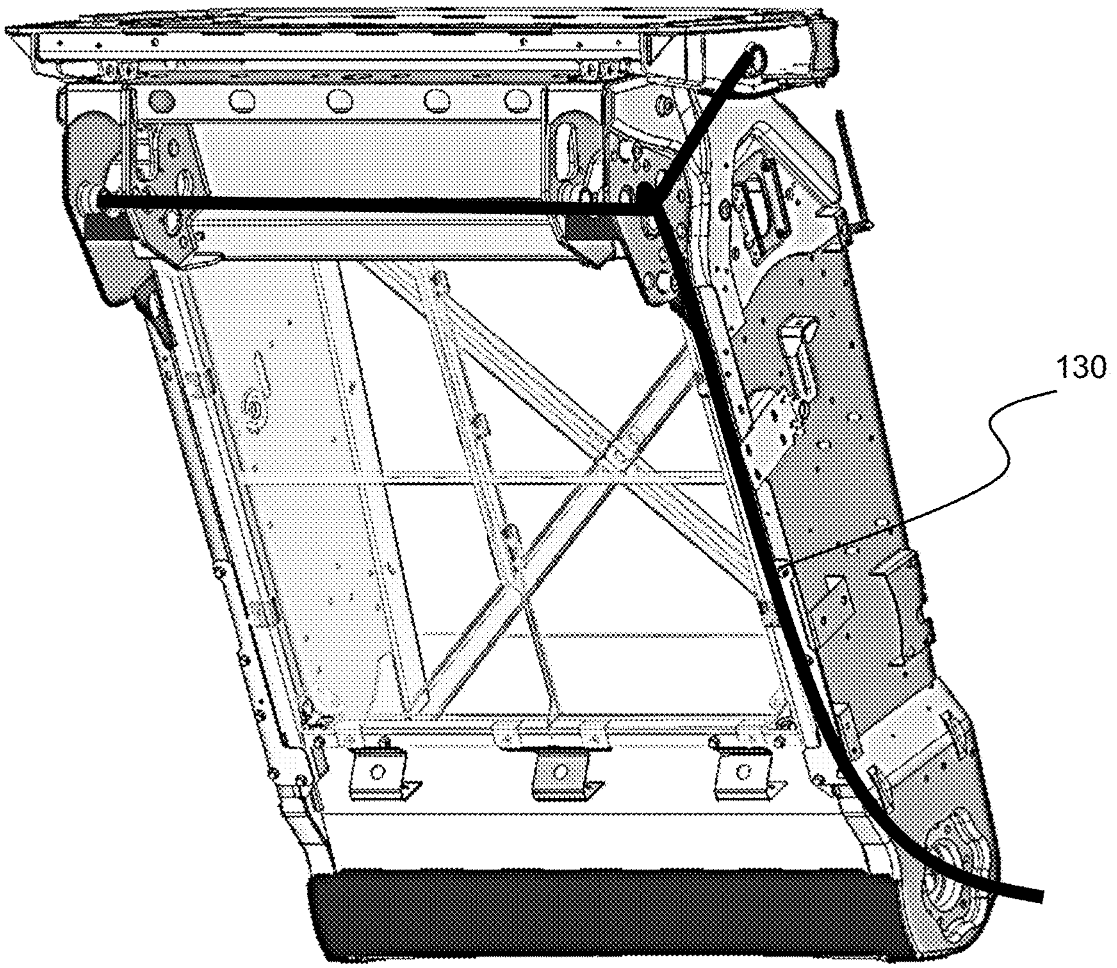
FIG. 5 shows the underside of the design of FIG. 4 with added lines to show how loads are transmitted through the structure.

FIG. 5 shows the underside of the design of FIG. 4 with added lines 130 to show how loads are transmitted through the structure. Loads are concentrated at the edges of the framework where there are welds, rivets or bolts, and these joins can be prone to failure.

Figure 6:
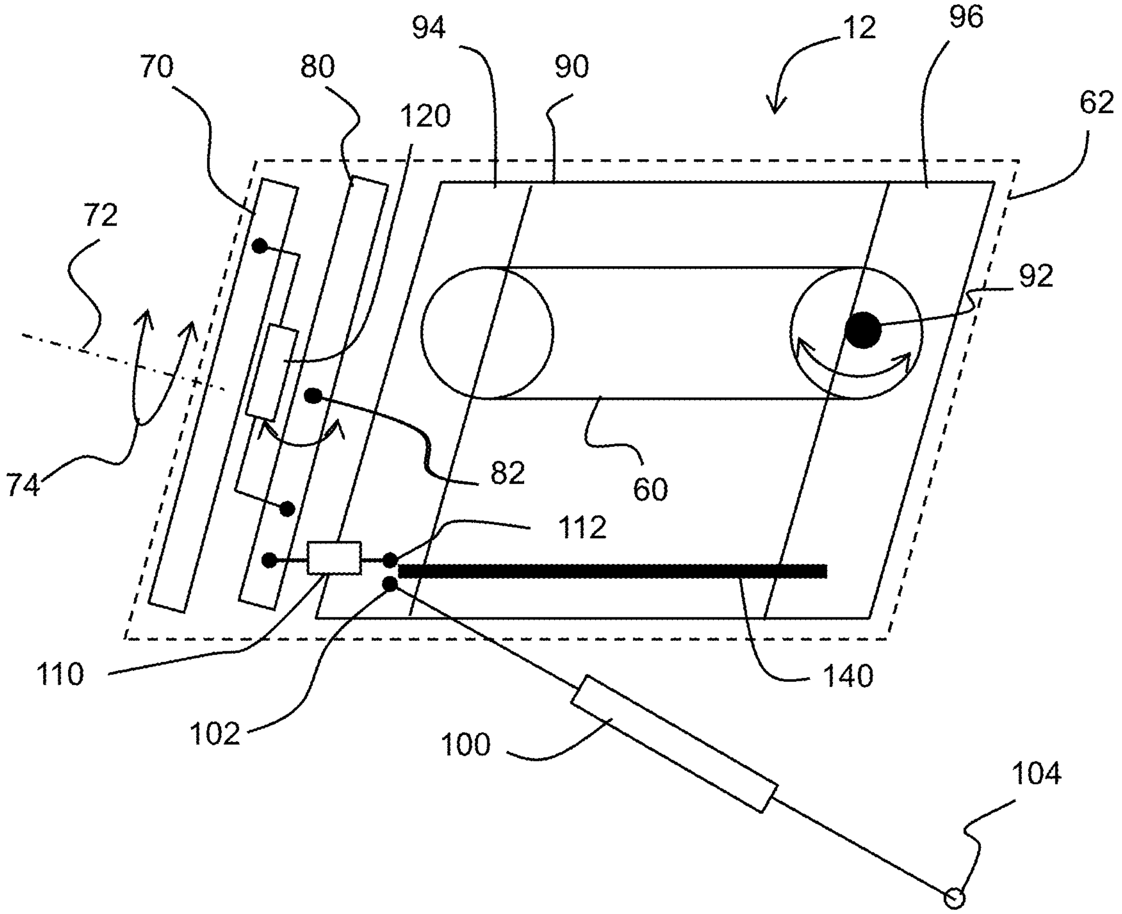
FIG. 6 shows the modification to the feederhouse in accordance with the invention in schematic form.

FIG. 6 shows the modification in accordance with the invention in schematic form. It shows the same design as FIG. 3 but with the modifications explained below.

The framework 90 is formed as a front housing section 94 which connects to the pitch frame (via the pitch actuator 110) and a rear housing section 96.

First and second reinforcement bars 140 are provided at opposite lateral sides (only one is seen in the side view of FIG. 6). These reinforcement bars connect between the front and rear housing sections. In particular, they connect to the front housing section at the location of the lift actuator pin 102 (and bush) and pitch actuator pin 112 (and bush).

The reinforcement bars connect to the lift actuator pin and pitch actuator pin. By this is meant there is a rigid connection between the end of the reinforcement bar and the pins, for example via a connector piece.

It is noted that the pins 102, 112 may be separate support pins or they may the same pin, with a first region that supports the lift actuator (and this region of the shared pin may be considered to be the lift actuator pin) and a second region that supports the pitch actuator (and this region of the shared pin may be considered to be the pitch actuator pin).

The pins on each side of the structure could also extend right across the width, so that a single shared pin the pins at each lateral side. Thus, each pin as described above may be considered to comprise a pin portion, and these pin portions may be separate or they may be joined to form longer support pins.

This feederhouse structure is able to tolerate increased vertical torsion load resulting from tilting actuation of the feederhouse and also increased vertical load resulting from an increase in header weight. The reinforcement bars work either in traction or in compression depending on which way the header is tilting.

The structure gives an improved distribution of internal stresses and strains and thus enables increased torsional as well as vertical load to be tolerated. The design depends more completely on the component designs and less on the manufacturing process especially welds witch usually are the weak points for fatigue.

Figure 7:
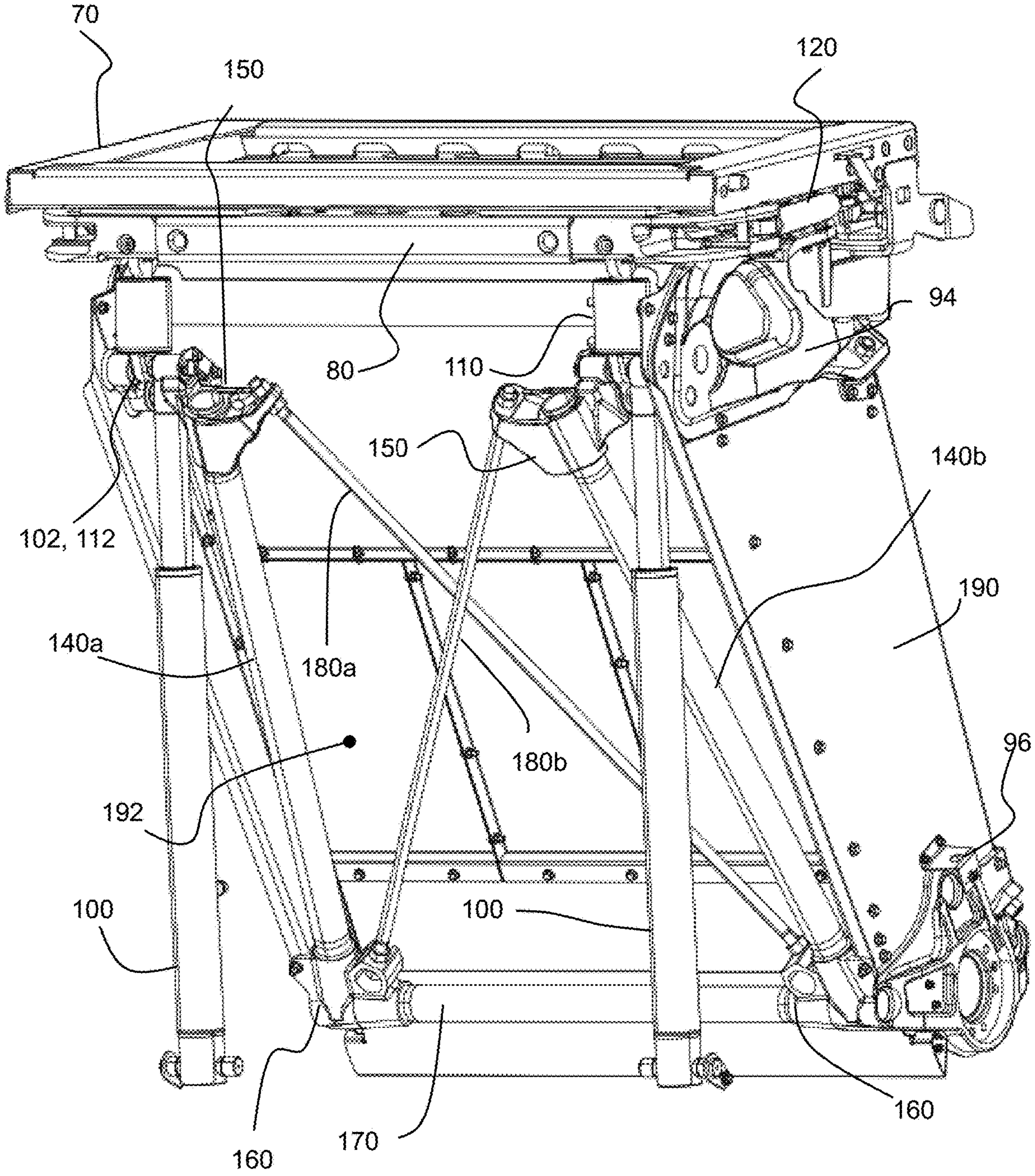
FIG. 7 shows the underside of the feederhouse in more detail.

FIG. 7 shows the underside of the feederhouse, with the connected pitch frame 80 and tilt frame 70.

The two reinforcement bars 140*a*, 140*b* are located at the underside of the feederhouse. There is a first reinforcement bar 140*a* and a second reinforcement bar 140*b*. A first end of each reinforcement bar connects to a cast front connector unit 150.

This front connector unit 150 connects a front end of the respective reinforcement bar to a respective one of the lift actuator pins 102 and to a respective one of the pitch actuator pins 112 (which may be separate or together form a single pin as explained above). The connector unit has an opening or openings for receiving the pins. Thus, the pins extend between the front housing section 94 and the connector unit. A rear end of each reinforcement bar is connected to a rear connector unit 160. The two rear connector units 160 are coupled together by a cross bar 170, and the rear connector units are formed as integral parts of the rear housing section 96. Thus, the rear housing section may be considered to comprise the cast side parts, the connector units 160 and the cross bar 170.

FIG. 7 also shows that the front and rear connection units make a further connection to first and second cross braces 180*a*, 180*b*. A first cross brace 180*a* is connected between the first (front) end of the first reinforcement bar 140*a* and the second (rear) end of the second reinforcement bar 140*b* and a second cross brace 180*b* is connected between the second (rear) end of the first reinforcement bar 140*a* and the first (front) end of the second reinforcement bar 140*b*. These two cross braces together from an X brace to stabilize the two lateral sides.

The first and second reinforcement bars 140*a*, 140*b* have a required stiffness, which is achieved by providing a large diameter and wall thickness. This may be determined by structural analysis. The moment of inertia of this component is important, to support vertical torsion loads, and hence a small diameter bar for example will not be sufficient because of the side load. The bars are formed as seamless tubes to enable high wall thickness and to avoid weak points. By way of example, the reinforcement bars comprise tubes with a diameter between 70 mm and 80 mm.

The enclosure formed by the feederhouse comprises paneling (side panels 190 and top and bottom panels). FIG. 7 shows removable bottom panels 192. This is made easier because the paneling is no longer a main structural feature.

FIG. 7 shows the lift actuators 100, the pitch actuators and the tilt actuators 120. It also shows the shared support pin 102, 112.

Figure 8:
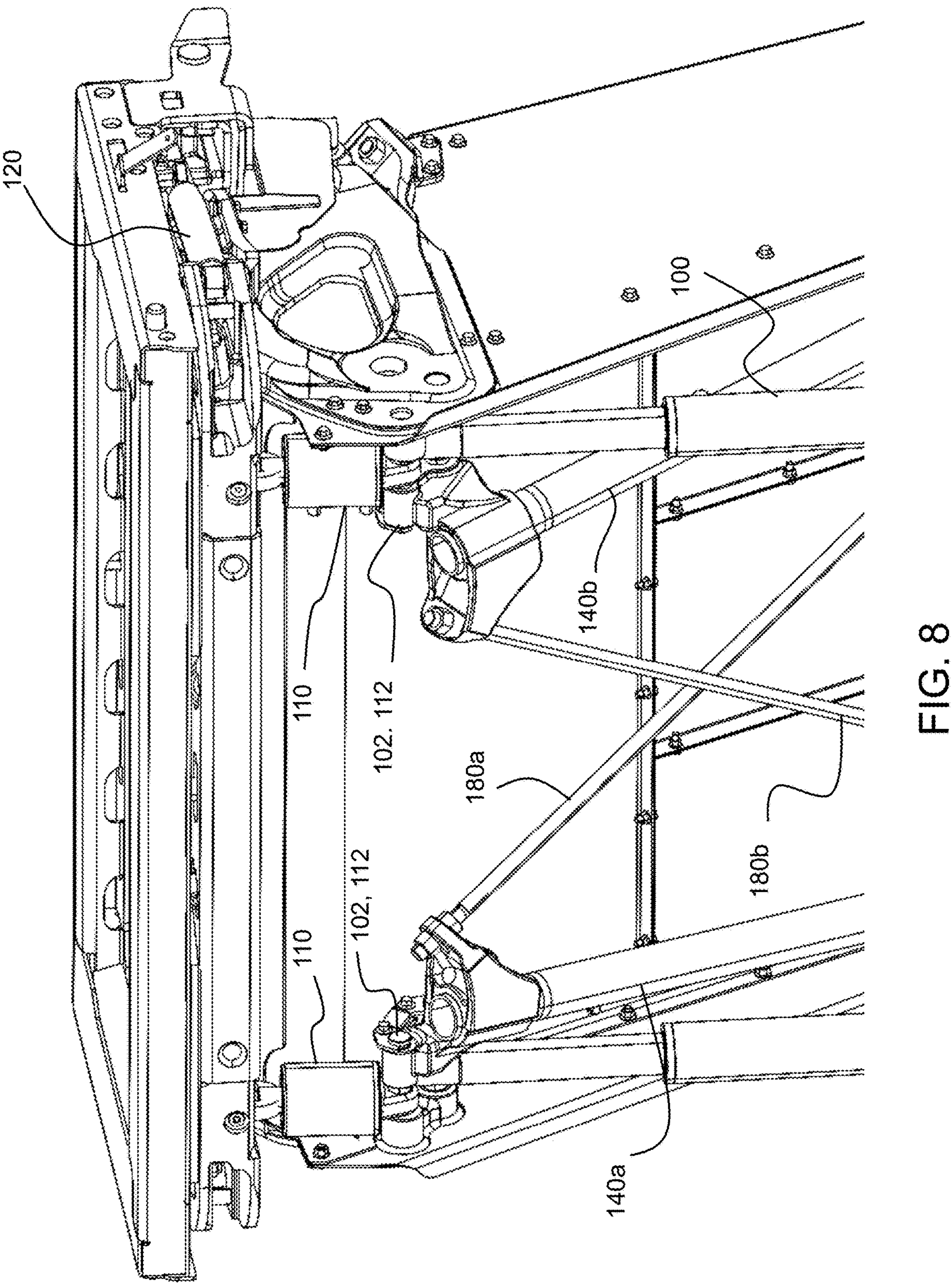
FIG. 8 shows the top part of FIG. 7 enlarged.
Figure 9:
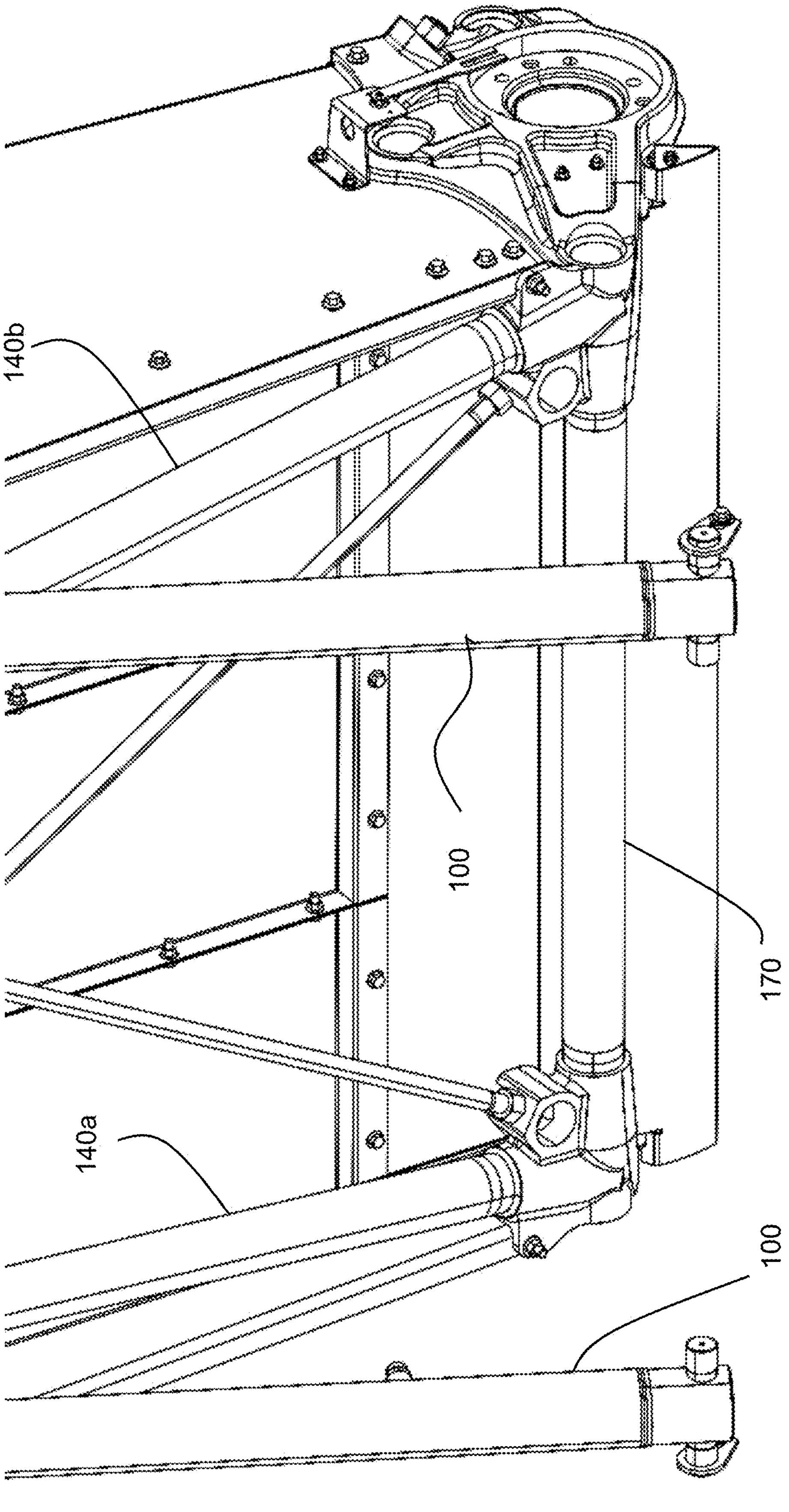
FIG. 9 shows the bottom part of FIG. 7 enlarged.

FIG. 8 shows the top part of FIG. 7 enlarged and FIG. 9 shows the bottom part of FIG. 7 enlarged.

Figure 10:
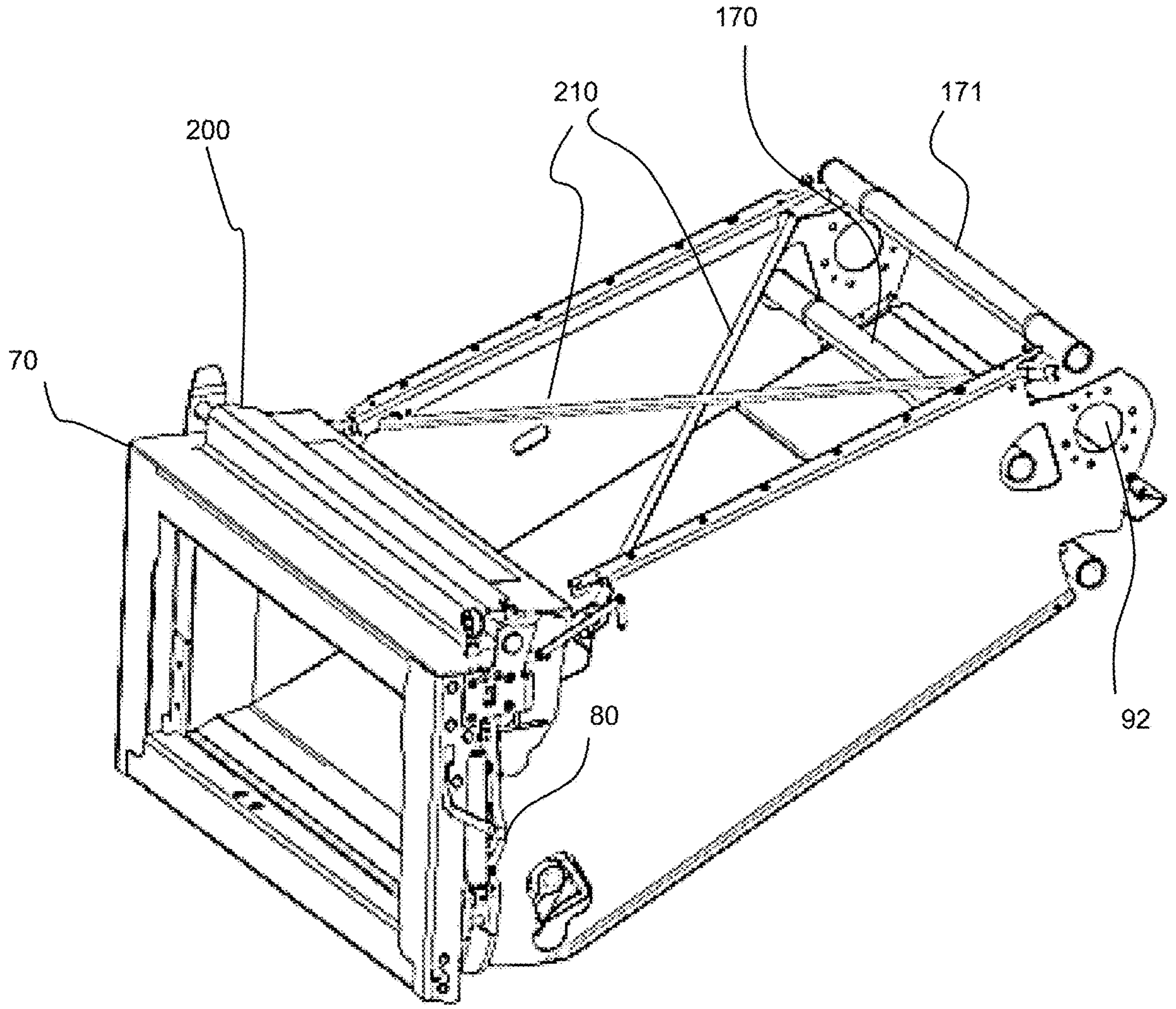
FIG. 10 shows another view of the feederhouse (with the actuators removed) showing the top of the feederhouse.

FIG. 10 shows another view to show the general shape in more schematic from (with the actuators removed and the side castings to which the reinforcement bars connect). FIG. 10 is used to show that the front housing section comprises a cross bar 200 which connects the two front cast side pieces (shown in FIG. 8). The rear housing section also has an upper cross bar 171 in addition to the cross bar 170 described above, between the rear cast side pieces (shown in FIG. 9).

The top of the feederhouse also has an X brace 210. The two arms of the X-brace are used to support the traction loads.

By way of example, the tilt frame allows adjustment of +/−8 degrees and the pitch frame allows adjustment of +/−6 degrees.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

All references cited herein are incorporated herein in their entireties. If there is a conflict between definitions herein and in an incorporated reference, the definition herein shall control.

What is claimed is:

1. A feederhouse for a combine harvester, comprising:

a drive belt;

a frame structure which encloses the drive belt, wherein the frame structure comprises:

a tilt frame for connection to a header, wherein the tilt frame is rotatably adjustable about a longitudinal axis;

a pitch frame connected to tilt frame, wherein the pitch frame is rotatably adjustable about a lateral axis;

a front housing section which connects to the pitch frame; and a rear housing section which has a pivotable connection for connection to a chassis of the combine harvester, first and second lift actuators and first and second lift actuator pins, wherein the lift actuator pins each connect to the front housing section at opposite lateral sides and the lift actuators each connect to a lift actuator pin at one end and are for connection to the combine harvester chassis at the other end;

first and second pitch actuators and first and second pitch actuator pins, wherein the pitch actuator pins each connect to the front housing section at opposite lateral sides and the pitch actuators each connect to a pitch actuator pin at one end and connect to the pitch frame at the other end; and first and second tilt actuators each connected between the tilt frame and the pitch frame, at opposite lateral sides, wherein the feederhouse further comprises first and second reinforcement bars at opposite lateral sides, wherein each reinforcement bar connects to the lift actuator pin and pitch actuator pin at a first end and to the rear housing section at an opposite second end.

2. The feederhouse of claim 1, further comprising a first cross brace connected between the first end of the first reinforcement bar and the second end of the second reinforcement bar and a second cross brace connected between the second end of the first reinforcement bar and the first end of the second reinforcement bar.

3. The feederhouse of claim 1, wherein the lift actuators, pitch actuators and tilt actuators each comprise a hydraulic cylinder.

4. The feederhouse of claim 1, wherein the first and second reinforcement bars are at an underside of the feederhouse.

5. The feederhouse of claim 1, wherein the front housing section and rear housing section comprise lateral metal casts and one or more cross bars connecting the lateral metal casts.

6. The feederhouse of claim 1, further comprising paneling between the front and rear housing sections.

7. The feederhouse of claim 1, wherein one or more panels are removable from the underside of the feederhouse.

8. A combine harvester comprising:

a crop cutting head;

the feederhouse of claim 1;

a threshing system;

a separating system; and a grain cleaning system for receiving the cut and threshed crop material.

* * * * *